United States Patent [19]

Irie et al.

[11] Patent Number: 5,250,640
[45] Date of Patent: Oct. 5, 1993

[54] METHOD FOR PRODUCTION OF PARTICULATE HYDROGEL POLYMER AND ABSORBENT RESIN

[75] Inventors: Yoshio Irie; Takumi Hatsuda, both of Himeji; Koichi Yonemura, Suita; Kazumasa Kimura, Ikoma, all of Japan

[73] Assignee: Nippon Shokubai Co., Ltd., Osaka, Japan

[21] Appl. No.: 865,865

[22] Filed: Apr. 9, 1992

[30] Foreign Application Priority Data

Apr. 10, 1991 [JP] Japan .................................. 3-77921

[51] Int. Cl.⁵ .............................................. C08F 2/10
[52] U.S. Cl. ...................................... 526/88; 528/502
[58] Field of Search ............................ 528/502; 526/88

[56] References Cited

U.S. PATENT DOCUMENTS

| | | | |
|---|---|---|---|
| 3,905,122 | 9/1975 | Ohshima et al. | 34/17 |
| 3,996,411 | 12/1978 | Ohshima et al. | 526/88 |
| 4,625,001 | 11/1986 | Tsubakimoto et al. | 526/62 |
| 4,654,039 | 3/1987 | Brandt et al. | 604/368 |
| 4,985,314 | 1/1991 | Kimura et al. | 526/88 |
| 5,124,416 | 1/1992 | Haruna et al. | 526/88 |

FOREIGN PATENT DOCUMENTS

0403160 12/1990 European Pat. Off. .
57-34101 2/1982 Japan .

Primary Examiner—Joseph L. Schofer
Assistant Examiner—David Wu
Attorney, Agent, or Firm—Burns, Doane, Swecker & Mathis

[57] ABSTRACT

A method for the production of a particulate hydrogel polymer by the exposure of a hydrogel polymer possessing a cross-linked structure to shear force in a vessel thereby finely dividing said hydrogel polymer, which method comprises exerting shear force repeatedly on said hydrogel polymer while keeping said hydrogel polymer at a temperature in the range of from 40° to 110° C. under a mechanical pressure in the range of from 0.01 to 1.5 kg/cm², and method for the production of an absorbent resin comprising drying the resultant particulate hydrogel polymer.

17 Claims, 6 Drawing Sheets

FIG.7

METHOD FOR PRODUCTION OF PARTICULATE HYDROGEL POLYMER AND ABSORBENT RESIN

BACKGROUND OF THE INVENTION

1. Field of the Invention

This invention relates to a method for the production of a particulate hydrogel polymer and an absorbent resin. More particularly, it relates to a method for the production of a particulate hydrogel polymer, characterized by continuing application of a load of a magnitude in a specific range on a hydrogel polymer possessing a cross-linked structure at a specific temperature and meanwhile repeating exertion of a shear force thereon. It further relates to a method for the production of an absorbent resin by further drying the particulate hydrogel polymer.

2. Description of the Prior Art

As absorbent resins, cross-linked polyacrylates, saponified acrylic ester-vinyl acetate copolymers, modified cross-linked polyvinyl alcohol, cross-linked isobutylenemaleic anhydride copolymer, starch-acrylic acid graft polymer, etc. have been known to the art. These absorbent resins have been finding extensive utility in applications to such hygienic absorbents as hygienic napkins and disposable diapers and to water-retaining agents and dehydrating agents in the agricultural-horticultural field and the civil engineering field.

As respects methods for the production of absorbent resins, those resorting to reversed-phase suspension polymerization have been disclosed in JP-A-57-161,408(1981), JP-A-59-94,011(1982), JP-A-57-158,209(1982), and JP-A-57-198,714(1982), for example, and those resorting to aqueous solution polymerization have been disclosed in JP-A-59-34,101(1982), JP-B-48-42,466(1973), JP-A-58-49,714(1983), and JP-B-59-37,003(1984), U.S. Pat. No. 4,286,082 and U.S. Pat. No. 4,625,001, for example.

The methods of reversed-phase suspension polymerization, however, require use of an organic solvent, consequently not only impair work environment but also threaten the possibility of fire and explosion, necessitate adoption of a countermeasure, and prove highly expensive on account of the cost for the organic solvent coupled with the cost for removal of the used organic solvent. Moreover, since this organic solvent persists, though in a minute amount, in the produced polymer, the inevitable work for thorough removal of the organic solvent further boosts the cost of production of the polymer. The absorbent resin produced by the reversed-phase suspension polymerization comprises spherical particles of small diameters. When this absorbent resin is used in a disposable diaper, for example, the handling of this diaper is inconvenient because the minute spherical particles of the resin deposited on fibrous absorption cores such as of pulp are not retained fast thereto but are readily separated therefrom.

In contrast, the methods of aqueous solution polymerization disclosed in JP-A-57-34,101(1982) and U.S. Pat. No. 4,625,001 are free from the problem described above. These methods produce a cross-linked polymer by subjecting the aqueous solution of a monomer destined to form a cross-linked structure and grow into a hydrogel polymer in the process of aqueous solution polymerization and a polymerization initiator to radical solution polymerization in a reaction vessel provided with stirring vanes and continuing the radical solution polymerization while finely dividing the hydrogel polymer being formed in consequence of the polymerization by dint of the shear force generated by the rotation of the stirring vanes around the axis thereof. These methods are advantageous in that their operational efficiency is exceptionally high and a finely divided hydrogel polymer having a cross-linked structure in the molecular unit thereof is produced in a high efficiency. Even these methods have the possibility of betraying inferiority of operational efficiency in the production of an absorbent resin having a high absorption ratio and containing a water-soluble substance in a low concentration.

The phenomenon that an absorbent resin increases an absorption ratio thereof in proportion as the cross-link density thereof decreases is well known to persons of ordinary skill in the art. It is also known that an absorbent resin produced by a procedure involving the work of lowering the cross-link density inevitably contains a water-soluble substance in an unduly large concentration. The water-soluble substance is of such nature that when the absorbent resin forms a hydrogel structure on contact with a liquid such as water, urine, or body fluid which is subjected to absorption, this substance is exudated from the hydrogel structure. The water-soluble substance which is extracted by the liquid being absorbed not merely lowers the absorption ratio of the absorbent resin but also aggravates the deterioration of the absorbent resin. Moreover, the ropy substance which the water-soluble substance produces on contact with a liquid induces an objectionable situation as by conferring an unpleasant feeling on the user's skin and defiling the liquid subjected to absorption, for example.

A desire, therefore, has been expressed for a method which is capable of producing an absorbent resin having a high absorption ratio and containing a water-soluble substance only in a low concentration.

U.S. Pat. No. 4,654,039 and JP-A-1-144,404(1990) propose methods for producing an absorbent resin having a high absorption ratio and containing a water-soluble substance in a low concentration by subjecting to aqueous solution polymerization a monomer having a free acid type structure or exhibiting a specific neutralization ratio. These methods of production, however, are disadvantageous in that they require an aftertreatment for neutralization, they entail a complicated operation and suffer from poor productivity, and they impose restrictions on conditions of polymerization.

The hydrogel polymer which is obtained by polymerization is generally subjected to a drying treatment and then pulverized and marketed as a powdered product. Heretofore, for the purpose of efficiently carrying out this drying of the hydrogel polymer, devices have been employed for increasing the surface area of the hydrogel polymer to the fullest possible extent. A method for pulverizing a hydrogel polymer by extruding this polymer through a perforated plate (JP-B-54-32,176(1979), JP-A-50-136,348(1975), etc.) has been known, for example. By this known method, hydrogel polymer particles ideal for the utility aimed at cannot be obtained because the extrusion disintegrates the hydrogel polymer into a fine powder which possibly reconglomerates and gives rise to a ropy substance.

A method which uses such an additive as a lubricant for the purpose of precluding the possible reconglomeration of disintegrated hydrogel polymer in the operation of pulverizing a hydrogel polymer by extrusion through a perforated plate (JP-A-59-30,826(1984) and JP-59-119,172(1984)) has been known. This method has the possibility that the additive suffered to remain in the produced polymer will manifest an adverse effect on the performance of a finished product of the polymer.

The aforementioned methods disclosed in JP-A-57-34,101(1982) and U.S. Pat. No. 4,625,001 are capable of producing hydrogel polymer particles of relatively small diameters. These hydrogel polymer particles have the disadvantage that they contain coarse particles measuring not less than 10 mm in size in a proportion of several % by weight to some tens of % by weight, have a wide particle size distribution, and betray deficiency in uniformity of drying efficiency and degree of drying.

Further, by the conventional method for pulverization of the hydrogel polymer, the production of hydrogel polymer particles of a sufficiently small average diameter has been obtained only with difficulty in a conspicuously low efficiency. When hodrogel polymer particles are dried to afford a finished product of particles of a desired size, the dried hydrogel polymer particles must be pulverized if the original hydrogel polymer particles have a large average particle diameter. The pulverization gives rise to minute particles which are smaller than the desired size. It is universally known to persons of ordinary skill in the art that these minute particles are undesirable in point of performance of the absorbent resin and convenience of handling.

No method has yet been established for enabling hydrogel polymer particles and an absorbent resin which have a high absorption ratio and contain a water-soluble substance only in a small concentration to be produced in a high operational efficiency by a convenient process. Neither has there been established a method capable of highly efficiently producing hydrogel polymer particles which contain no such additive as a lubricant, exhibit a narrow particle size distribution, and excel in efficiency of drying. A method capable of efficiently producing hydrogel polymer particles having a sufficiently small average diameter remains yet to be established.

An object of this invention, therefore, is to provide a method for producing hydrogel polymer particles and an absorbent resin having a high absorption ratio and containing a water-soluble substance only in a small concentration.

Another object of this invention is to provide a method for enabling hydrogel polymer particles and an absorbent resin having a high absorption ratio and containing a water-soluble substance only in a small concentration to be produced in a high operational efficiency by a convenient process.

Still another object of this invention is to provide a method for highly efficiently producing hydrogel polymer particles containing no such additive as a lubricant, exhibiting a narrow particle size distribution, and excelling in efficiency of drying.

Yet another object of this invention is to provide a method for producing highly efficiently hydrogel polymer particles having a sufficiently small average particle diameter.

SUMMARY OF THE INVENTION

The objects of this invention described above are accomplished by a method for the production of particulate hydrogel polymer by the exposure of a hydrogel polymer possessing a cross-linked structure to shear force in a vessel thereby finely dividing said hydrogel polymer, which method comprises exerting shear force repeatedly on said hydrogel polymer at a temperature in the range of from 40° to 110° C. under a mechanical pressure in the range of from 0.01 to 1.5 kg/cm$^2$.

These objects are also accomplished by a method for the production of an absorbent resin, comprising drying the hydrogel polymer particles.

By the execution of the method of this invention as described above, hydrogel polymer particles and an absorbent resin which have a high absorption ratio and contain a water-soluble substance only in a small concentration can be produced in a high operational efficiency. The method of this invention also enables hydrogel polymer particles containing no such additive as a lubricant, exhibiting a narrow particle size distribution, and excelling in efficiency of drying to be produced in high operational efficiency. This invention also allows production of an absorbent resin exhibiting a high absorption speed and containing unduly minute particles in a small concentration. It allows production of an absorbent resin exhibiting a high absorption speed under application of pressure. It further enables an absorbent resin having an extremely small residual monomer content to be produced in a high operational efficiency.

EXPLANATION OF PREFERRED EMBODIMENTS

The hydrogel polymer of this invention has no particular restriction except for the requirement that it should be a hydrogel which possesses a cross-linked structure and assumes the form of gel on inclusion of water. It is a hydrogel polymer having a water content generally in the range of from 40 to 90% by weight, preferably from 50 to 80% by weight. The term "water content" of a hydrogel polymer as used in this invention refers to the proportion of water to the total weight of the hydrogel polymer as expressed in % by weight. It is essential for effective use in this invention that the hydrogel polymer should possess a cross-linked structure. A hydrogel polymer having no cross-linked structure fails to fulfil the objects of this invention.

The hydrogel polymer of this invention is obtained by a method which comprises placing in a mold frame a monomer which, on aqueous solution polymerization, forms a cross-linked structure and grows into a hydrogel polymer and then polymerizing the monomer (JP-A-55-133,413(1980)) or a method which comprises polymerizing the monomer component in a kneader provided in the interior thereof with a stirring shaft capable of finely dividing the formed hydrogel polymer (JP-A-57-34,101(1982)), for example. In the monomer components which are effectively usable in the method of polymerization described above, the water-soluble unsaturated monomers include anionic monomers such as (meth)acrylic acid, maleic acid (anhydride), fumaric acid, crotonic acid, itaconic acid, 2-(meth)acryloyl ethanesulfonic acid, 2-(meth)acryloyl propanesulfonic acid, 2-(meth)acrylamide-2-methyl propanesulfonic acid, vinyl sulfonic acid, and styrene sulfonic acid and salts thereof; nonionic hydrophilic group-containing monomers such as (meth)acrylamide, N-substituted (meth)acrylamides, 2-hydroxyethyl (meth)acrylate, 2-hydroxypropyl (meth)acrylate, methoxypolyethylene glycol (meth)acrylate, and polyethylene glycol (meth)acrylate; and amino group-containing unsaturated monomers such as N,N-dimethylaminoethyl (meth)acrylate, N,N-dimethylaminopropyl (meth)acrylate, and N,N-dimethylaminopropyl (meth)acrylamide and quaternization products thereof, for example. Optionally, a hydrophobic monomer such as an acrylic ester like methyl (meth)acrylate, ethyl (meth)acrylate, or butyl (meth)acrylate or vinyl acetate or vinyl propionate may be used in an amount such as to avoid conspicuously impeding the hydrophilicity of the produced hydrogel polymer. As the monomer component, one member or a mixture of two or more members selected from the typical examples of monomer component cited above can be used. In consideration of various absorption properties of the absorbent resin to be finally obtained, it is preferable to use at least one member selected from the group consisting of (meth)acrylic acid (and salts thereof), 2-(meth)acryloyl ethanesulfonic acid (and salts thereof), 2-(meth)acrylamide-2-methyl propanesulfonic acid (and salts thereof), (meth)acrylamide, methoxy polyethylene glycol (meth)acrylate, N,N-dimethyl aminoethyl (meth)acrylate, and quaternization products thereof. The monomer component is preferable to contain one member selected from among (meth)acrylic acid and salts thereof as an essential constituent thereof. Most preferably, 30 to 90 mol % of the (meth)acrylic acid is neutralized with a basic substance.

The hydrogel polymer of this invention may be a self-linking type which is producible without use of a cross-linking agent or a type which is producible by the use of a cross-linking agent containing a polymerizing unsaturated group and/or a reactive functional group in an amount enough for the various properties of the produced absorbent resin to reach desired levels. The amount thereof to be used is generally 0.001 to 1.0 mol %, preferably 0.01 to 0.5 mol % to the monomer component.

As typical examples of this cross-linking agent, N,N'-methylenebis(meth)acrylamide, (poly)ethylene glycol (meth)acrylate, glycerol tri(meth)acrylate, trimethylol propane tri(meth)acrylate, triallylamine, triallyl cyanurate, triallyl isocyanurate, glycidyl (meth)acrylates, (poly)ethylene glycol, diethylene glycol, (poly)glycerol, propylene glycol, diethanol amine, trimethylol propane, pentaerythritol, (poly)ethylene glycol diglycidyl ether, (poly)glycerol polyglicidyl ether, epichlorohydrin, ethylene diamine, polyethylene imine, (poly)aluminum chloride, aluminum sulfate, calcium chloride, and magnesium sulfate may be cited. One member or a mixture of two or more members selected from among the typical examples cited above in due consideration of the reactivity may be used.

In the production of the hydrogel polymer, formation of a graft link or a complex may be effected in conjunction with the polymerization by polymerizing the aforementioned monomer component in the presence of a hydrophilic macromolecular compound such as starch, cellulose, or polyvinyl alcohol.

The polymerization of the monomer component mentioned above can be effected by the use of a water-soluble radical polymerization initiator such as, for example, ammonium persulfate, potassium persulfate, hydrogen peroxide, t-butyl hydroperoxide, or 2,2'-azobisamidinopropane dihydrochloride.

The hydrogel polymer of this invention is required only to be a hydrogel which assumes the form of a water-containing gel, wherein the polymerization of the monomer component may be proceeding or may have been completed. Generally, a hydrogel polymer possessing a cross-linked structure assumes the form of a hydrogel like the hydrogel polymer of this invention when the degree of polymerization is about several %, so the shear force under mechanical pressure may be loaded at an optional time to the hydrogel having at least several % of polymerization degree. The hydrogel has polymerization degree in the range of preferably from 10 to 100%, and more preferably from 20 to 100%. Of course, the monomer components prior to be a water-containing gel may be loaded a usual mixing operation, but in the exertion of shear force on the monomer component while the degree of polymerization of this-monomer component is low, it is suspected that such undesirable phenomena as a decrease of the basic molecular weight may arise when the exertion of the shear force is excessive, so it is required attention.

The production of the hydrogel polymer particles of this invention is accomplished by keeping the hydrogel polymer under the conditions mentioned above and meanwhile exerting the shear force thereon. This production can be performed in any desired manner capable of fulfilling these conditions. As concrete examples of the manner of effecting this production, the following procedures may be cited.

1. Exertion of the shear force on the hydrogel polymer after completion of the polymerization under the conditions mentioned above.

2. Exertion of the shear force on the hydrogel polymer during the process of the polymerization under the conditions mentioned above.

3. Continuation of the polymerization and simultaneous exertion of the shear force on the produced hydrogel polymer under the conditions mentioned above.

Figure 1:
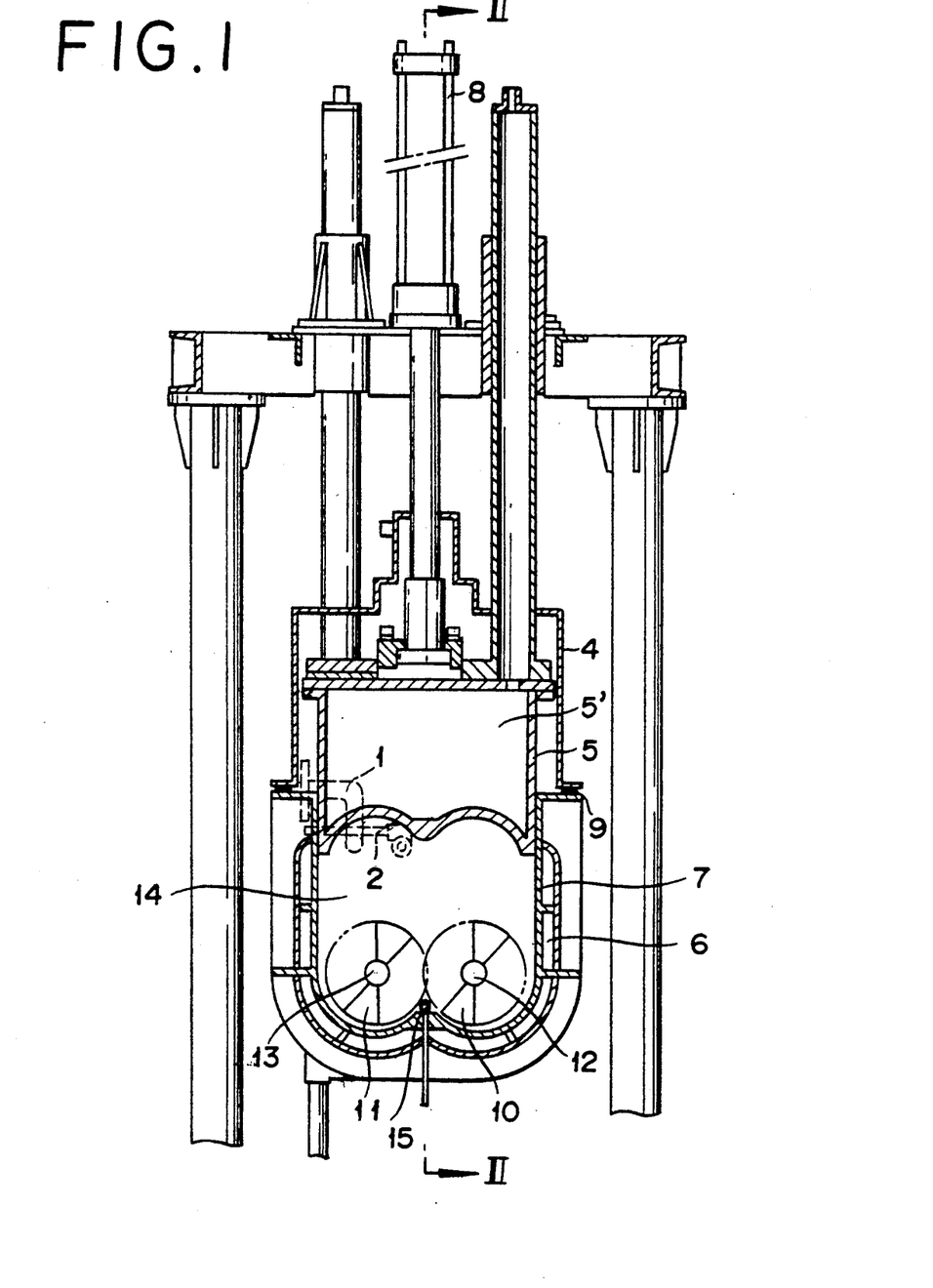
FIG. 1 is a cross section illustrating schematically one embodiment of a vessel to be used for the exertion of shear force on a hydrogel polymer in accordance with this invention.
Figure 2:
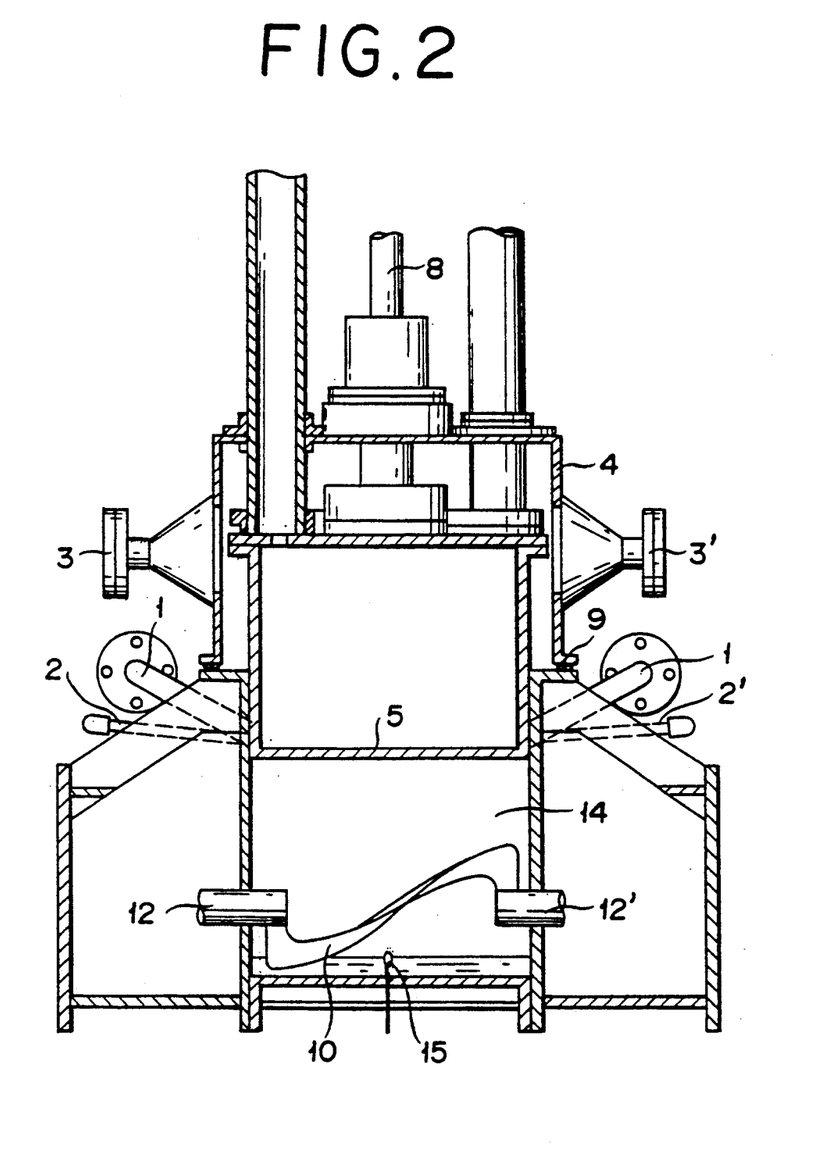
FIG. 2 is a schematic cross section taken through FIG. 1 along the line II—II.
Figure 3:
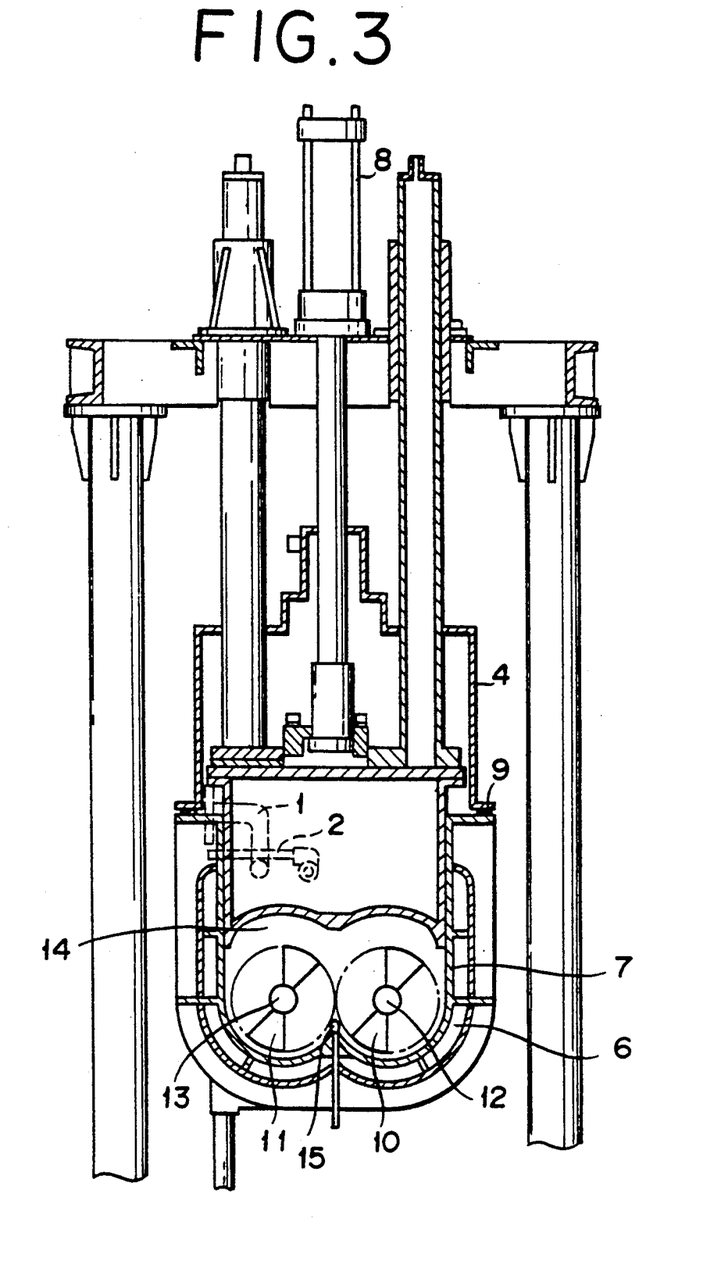
FIG. 3 is a cross section illustrating schematically another embodiment of the vessel to be used for the exertion of shear force on a hydrogel polymer in accordance with this invention.

An apparatus constructed as illustrated in FIG. 1 may be cited as equipment ideal for the execution of the second or third of the procedures enumerated above. FIG. 2 is a schematic cross section taken through FIG. 1 along the line II—II. As illustrated in FIG. 1 and FIG. 2, in a vessel 7 of this embodiment, rotary arms 10 and 11 for exerting shear force on a hydrogel polymer are fixed along the longitudinal direction of the vessel 7 by rotary stirring shafts 12, 12' and 13, 13' (not shown) and a pressing lid 5 for mechanical pressure shaped in conformity to the peripherally moving parts of the rotary arms so as to avoid obstructing the rotation of the rotary arms 10 and 11 even when this pressing lid 5 is lowered to lower limit is set in place in the opening part of the vessel 7. In the state of the apparatus illustrated in FIG. 1, i.e. in the state in which the vessel 7 is retained substantially in an airtightly sealed state by the pressing lid 5 and, at the same time, a liquid inlet 1 and a gas inlet 2 are kept in an opened state relative to the vessel 7, the aqueous solution of a monomer component described above and an inert gas are supplied to the vessel 7. The amount of the aqueous solution of the monomer component to be supplied in this case is generally in the range of from 50 to 150% of the volume available for shear (the volume formed by the rotation of the rotary arms of the rotary stirring shafts minus the total volume of the rotary stirring shafts and the rotary arms). The inert gas introduced via the gas inlet 2 is passed through the interior of the vessel 7 and discharged via a gas outlet 1' or a nozzle 2'. At a desired time after polymerization of the monomer component is started to form a hydrogel polymer, a cylinder 8 is hydraulically or pneumatically moved to lower the pressing lid 5 onto the hydrogel polymer and apply a desired load to the hydrogel polymer and the rotary arms 10 and 11 are set into rotation to exert repeating shear force on the hydrogel polymer. One example of the ensuant state of the apparatus is illustrated in FIG. 3. At this time, the liquid inlet 1 and the gas inlet 2 are sealed off by the pressing lid 5 and are not allowed to admit the hydrogel polymer therein. In the meantime, the inert gas introduced via the gas inlet 2 is forwarded through a gap between the wall of the vessel 7 and the wall of the pressing lid 5 into a stirring space 14. The entire procedure starting from the charging of the vessel with the aqueous solution of the monomer component, going over the polymerization and the exertion of shear force on the formed hydrogel polymer kept under a load, and terminating in the removal of the produced hydrogel polymer particles can be carried out in the atmosphere of an inert gas as described above. The position of the liquid inlet 1 and that of the gas inlet 2 are desired to be higher than the level of the surface of the hydrogel polymer relieved from a load. As illustrated in FIGS. 1 to 3, a cover 4 is set in place round the external surface of the pressing lid 5 in such a manner as to be vertically reciprocated relative to the pressing lid 5. This cover 4 is shaped like a box having an open part in the lower end thereof. The cover 4 is provided in the lower terminal part thereof with a flange part adapted to be opposed to a flange part provided for the vessel 7. This flange part of the cover 4 is provided with a sealing member 9. When the pressing lid 5 is elevated, the cover 4 is allowed to contact the pressing lid 5 and then is elevated thereby. When the pressing lid 5 is moved downwardly by the cylinder 8 and brought to the position at which the lower terminal part of the pressing lid 5 begins to insert itself into the vessel 7, the flange part of the cover 4 contacts the flange part of the vessel 7 through the medium of the seal member 9, with the result that the space inside the cover 4 will be sealed off the ambient air by virtue of its own weight. After the flange parts of the cover 4 and the vessel 7 have come into mutual contact through the medium of the seal member 9, the pressing lid 5 alone is moved downwardly by the cylinder 8. The cover 4 is provided with a gas inlet 3 and a gas outlet 3'. While the apparatus is in the state illustrated in FIG. 1, the interior of the cover 4 can be displaced with the atmosphere of an inert gas by supplying the inert gas via the gas inlet 3. Though this cover 4 is not an indispensable component for the apparatus of this invention, it constitutes iteslf a desirable addition to rendering the atmosphere of the inert gas in the vessel 7 more perfect.

As the apparatus provided with the vessel to be used in this invention as described above, the ordinary batchwise kneader furnished at an opening part thereof with a necessary part (pressing lid), the mechanically pressing kneader, the internal mixer, the Banbury mixer, etc. can be used. Among other apparatuses cited above, the mechanically pressing kneader can be used ideally.

In this invention, the number of the rotary arms is preferable to be at least two. Particularly, the kneader is preferable to be of the twin arm type. The shapes which are usable for the rotary arms of this invention include the sigma (δ) type, the Z type, the spiral (S) type, the masticator type, the fishtail type, and the type having the cross section of a biconvex lens, for example. When the rotary arms mentioned above are of the twin arm type, the combination of the shapes of these rotary arms may be that of the sigma type with the spiral type or the Z type. The two rotary arms of such combination of shapes are rotated in mutually opposite directions at an equal speed or at different speeds. The manners of combination of rotations of the two rotary arms include the overlap type and the tangential type, for example. One such a combination can be selected to suit the various properties of the hydrogel polymer such as viscosity. Generally when the hydrogel polymer is a highly viscous substance, the tangential type is suitable. When the rotary arms are used in the internal mixer, the two pairs of rolls may be rotated in the same direction as differentiated in phase and the shear force may be exerted downwardly on the hydrogel polymer as kept under pressure in the same manner as in the pressing kneader or the Banbury mixer.

As the material for the rotary arms to be used in this invention, stainless steel may be used, for example.

The rate of rotation of the rotary arms to be used in this invention, though variable with the various properties of the hydrogel polymer such as viscosity, is in the range of from 0.01 to 10 m/s, preferably from 0.1 to 5 m/s, in terms of peripheral speed.

The apparatus of the embodiment described above is provided with a jacket 6 which is adapted to heat or cool the hydrogel polymer. The means to heat or cool the hydrogel polymer is not limited to the jacjet. The pressing lid 5 or the rotary arms may be constructed so as to allow passage therein of a medium for controlling the temperature, for example.

Figure 4A:
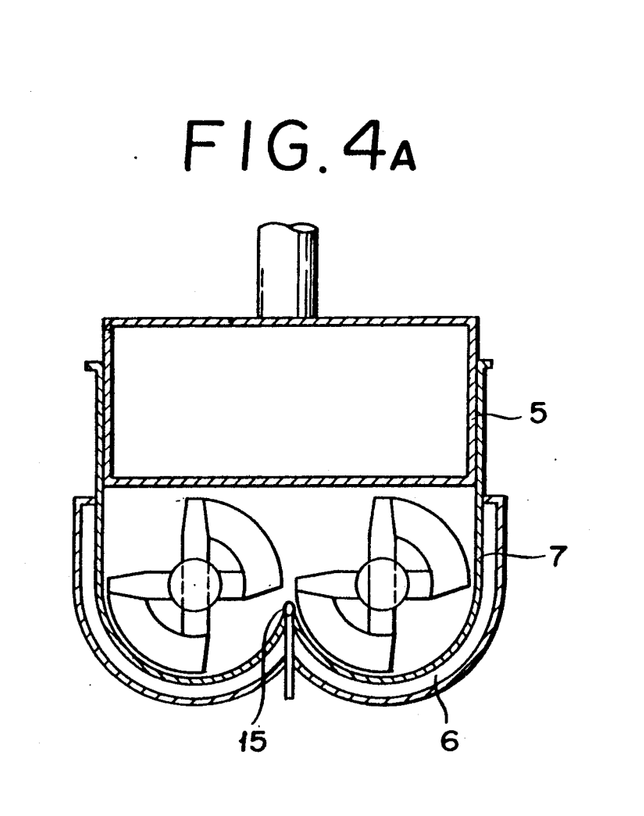
FIGS. 4A and 4B are cross sections illustrating schematically still another embodiment of the vessel to be used in this invention.
Figure 4B:
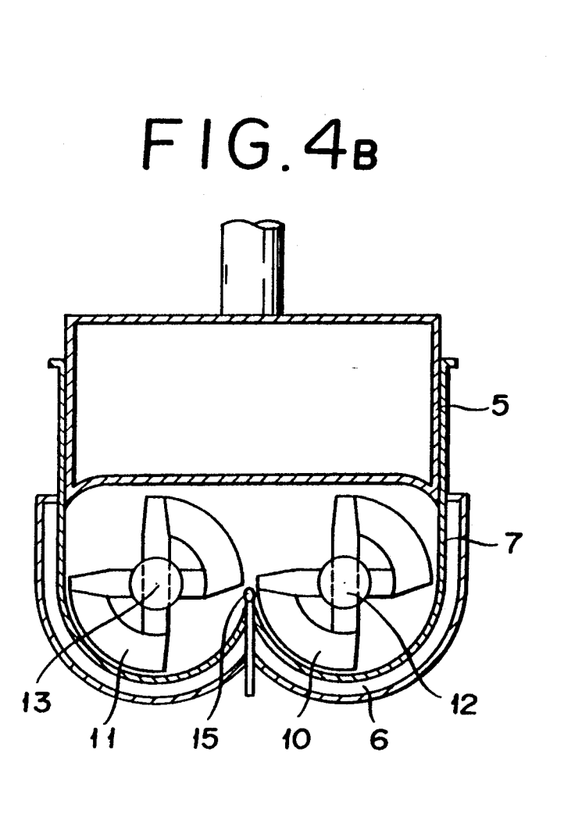

As respects the shape of the pressing lid to be used in this invention, the shape of a flat plate (FIG. 4A) and the shape made to conform to the peripherally moving part only on the wall surface side of the vessel (FIG. 4B) may be used in addition to the shape made to conform to the peripherally moving part of the rotary arms as illustrated in FIG. 1. The shape of the pressing lid is desired to be such that the hydrogel polymer will be wholly stirred and the shear force will be exerted uniformly on the whole of the hydrogen polymer. The pressing lid of the shape illustrated in FIG. 1 proves preferable in respect that this pressing lid does not allow easy retention of the hydrogel polymer in the vessel. The expression "uniform exertion of the shear force" mentioned above means the situation that a specific portion of the hydrogel polymer is not continuously retained at a specific position inside the vessel and the shear force is not continuously exerted only on part of the hydrogel polymer.

In this invention, the pressing lid is used for the purpose of applying a load in the range of from 0.01 to 1.5 kg/cm$^2$ to the hydrogel polymer. The load in this case is the sum of the weight of the pressing lid itself and the pneumatic or hydraulic pressure applied downwardly to the pressing lid. The load thus applied to the hydrogel polymer must be in the range of from 0.01 to 1.5 kg/cm$^2$, preferably from 0.05 to 1.0 kg/cm$^2$. If the load applied to the hydrogel polymer is less than 0.01 kg/cm$^2$, the shear force is not effectively exerted on the hydrogel polymer and the production of hydrogel polymer particles aimed at by this invention is obtained only with difficulty or with consumption of a long time. Conversely, if the load applied to the hydrogel polymer exceeds 1.5 kg/cm$^2$, the disadvantage ensues that the physical properties of the produced hydrogel polymer are impaired because the motive force necessary for the exertion of the shear force on the hydrogel polymer is unduly large and the hydrogel polymer is compelled to assume a kneading state.

The pressing lid to be used in this invention is preferable to be set at such a position inside the vessel that the volume of the interior of the vessel is in the range of from 1.1 to 1.8, preferably from 1.2 to 1.7, times the volume, $V_0$, of the hydrogel polymer and in the range of from 1.0 to 2.0, preferably 1.0 to 1.8, times the volume exposed to the shear force (hereinafter referred to as "effective shear volume"). The expression "volume exposed to the shear force", $V_1$, as used herein refers to the volume which remains after deduction of the total volume of the rotary stirring shafts and the rotary arms from the volume formed by the maximum circle of rotation of the rotary arms of the rotary stirring shafts. If the volume of the interior of the vessel is less than 1.1 times the volume, $V_0$, of the hydrogel polymer, the disadvantage arises that the physical properties of the produced hydrogel polymer will be impaired because the motive force necessary for the exertion of the shear force on the hydrogel polymer is unduly large and the hydrogel polymer itself is compelled to assume a kneading state. Conversely, if the volume of the interior of the vessel exceeds 1.8 times the volume, $V_0$, of the hydrogel polymer, the disadvantage ensues that the shear force will not be effectively exerted on the hydrogel and the production of the hydrogel polymer particles aimed at by this invention will be obtained only with difficulty or with consumption of a long time.

If the volume of the interior of the vessel exceeds 2.0 times the effective shear volume, $V_1$, the disadvantage arises that the shear force will not be effectively exerted on the hydrogel polymer and the production of the hydrogel polymer particles aimed at by this invention is obtained only with difficulty or with consumption of a long time.

The hydrogel polymer of this invention has no particular restriction except for the sole requirement that it should possess a size fit for introduction into the vessel to be employed for the execution of this invention. Even to the comminuted hydrogel polymer which is obtained by the method disclosed in JP-A-57-34,101(1982), for example, the method of this invention can be applied effectively to fulfil the object of this invention.

For this invention, it is an essential requirement that the hydrogel polymer should be heated to a temperature in the range of from 40° to 110° C., preferably from 40° to 100° C., more preferably 50° to 95° C. If the temperature of heating of the hydrogel polymer is less than 40° C., unduly large friction occurs between the plane of shear and the hydrogel polymer or between the adjacent hydrogel polymer particles and the physical properties of the produced hydrogel polymer are liable to be degraded. Conversely, if this temperature exceeds 110° C., since the evaporation of water from the hydrogel polymer occurs vigorously and the hydrogel polymer is consequently rising bubbles, the possibility arises that the shear force will not be amply exerted on the hydrogel polymer and the production of hydrogel polymer particles of sufficiently small particle diameters will not be attained and the disadvantage ensues that the deterioration of the hydrogel polymer will advance to the extent of conspicuously increasing the content of water-soluble substance.

This invention imposes no particular limit on the time to be spent for the exertion of the shear force. Generally, the time required for the exertion of the shear force can be decreased in proportion as the rate of rotation of the rotary stirring shafts is increased and the magnitude of the load applied to the hydrogel polymer is increased. The expression "exerting shear force repeatedly" as recited in the scope of claim for patent of this invention refers to the repetition of the exertion of the shear force on a specific lot of the hydrogel polymer. This manner of exertion of the shear force is different from the transient exertion of shear force which is observed as in the extrusion of a hydrogel polymer through a perforated plate by the use of a screw type extruding device, for example. By the temporal shear force, the particulate hydrogel polymer having sufficient various properties, especially absorbing rate cannot be obtained.

Figure 5:
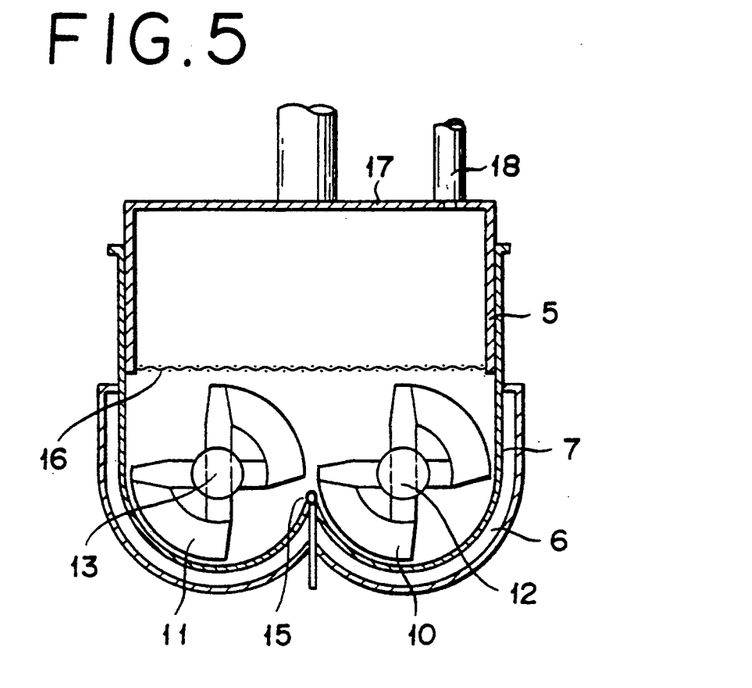
FIG. 5 is a cross section illustrating schematically yet another example of the vessel to be used in the exertion of shear force on a hydrogen polymer in accordance with this invention.

FIG. 5 is a cross section illustrating schematically another concrete example of the vessel to be used for exertion of shear force on the hydrogel polymer in this invention.

The vessel 7 illustrated in FIG. 5 is identical in construction to the vessel illustrated in FIG. 1, except that the pressing lid 5 is furnished with a meshed bottom part 16 and is provided in an upper part 17 thereof with a tube 18 adapted to decrease the pressure of the atmosphere inside the vessel. The vessel 5 thus constructed is enabled to decrease the pressure of the atmosphere inside the vessel via the meshed bottom part 16 and repress the otherwise inevitable rise of the temperature inside the vessel due to the heat generated during the polymerization and, at the same time, allow the polymerization to proceed. If the heat of polymerization which is generated when the monomer component is polymerized to form the hydrogel polymer and the shear force is exerted on the produced hydrogel polymer is not removed sufficiently, the disadvantage arises that the temperature of the reaction system rises excessively, the polymerization mixture undergoes the phenomenon of bumping in an extreme case, and the produced polymer suffers from inferior quality. For the purpose of effecting the removal of this heat more efficiently, the interior of the pressing lid and/or the rotary arms may be adopted to circulate cooling water in addition to the jacket and consequently increase the surface of heat transfer to be used for the removal of heat. If the removal of the heat is not sufficient for all these efforts, then the method resorting to diminution of the pressure inside the vessel can be effectively utilized.

Where the vessel illustrated in FIG. 5 is used, the degree of pressure to which the dimution is made is desired to be approximately in the range of from 1 to 500 mmHg, preferably from 1 to 400 mmHg.

In the method of production according to this invention, additives such as a surfactant may be incorporated in the hydrogel polymer at any desired point of time inclusive of the periods before and after the step for exertion of the shear force on the hydrogel polymer for the purpose of facilitating the adjustment of the particle diameters of the hydrogel polymer or improving the convenience of handling of the produced hydrogel polymer particles. Further, for the purpose of conferring new functions on the hydrogel polymer particles and the absorbent resin to be produced, the exertion of the shear force on the hydrogel polymer may be performed in the presence of water-soluble polymer, deodorant, perfume, plant growth promoter, fungicide, bactericide, defoaming agent, pigment, dye, activated carbon, and hydrophilic short fibers, for example.

The method for the production of the absorbent resin of this invention comprises drying the hydrogel polymer particles which have been obtained by the method of production described above.

For the drying mentioned above, any of the methods heretofore known to the art may be adopted. The means which are available for this drying include a box-type drying device, a ventilation type drying device, a ventilation band drying device, a ventilation type vertical drying device, and a rotary drying device, for example.

The temperature to be used for the drying of the hydrogel polymer may be the same as that which has been heretofore known to the art. To be specific, it is in the range of from 80° to 250° C., preferably from 100° to 200° C. If this temperature exceeds 250° C., the possibility arises that the polymer will be impaired and decomposed. The time required for drying the hydrogel polymer particles obtained by the method of this invention is notably short as compared with that required for drying the conventional hydrogel polymer, no matter whichever of the aforementioned methods of drying may be adopted.

The method of drying disclosed in JP-A-64-26,604(1989) allows a particularly advantageous embodiment of this invention in the drying of the hydrogel polymer particles. While this method is ideal for producing a polymer having a low residual monomer content, it has the disadvantage that the decrease of the residual monomer content is attained at a sacrifice of the efficiency of drying (efficiency of production). Owing to the use of the hydrogel polymer particles which are obtained by the method of production of this invention, the efficiency of drying is notably improved and the requirement that the absorption ratio should be high and the content of water-soluble substance should be small is satisfied as aimed at by this invention and the production of an absorbent resin having a notably low residual monomer content is attained in high efficiency.

The method for the production of the absorbent resin aimed at by this invention is characterized by drying the hydrogel polymer particles obtained by the aforementioned method of production and then pulverizing and-/or disintegrating the dried hydrogel polymer particles. In this invention, for the production of the pulverized absorbent resin, any of the methods heretofore adopted for pulverization of hydrogel polymer can be adopted. The means which are available for the pulverization include high-speed rotary pulverizers (such as pin mills, hammer mills, etc.), screw mills (such as coffee mills), and roll mills, for example. Particularly since the hydrogel polymer particles which are obtained by the method of this invention can be uniformly dried, the absorbent resin containing unduly minute particles only in a small concentration can be obtained from the dried hydrogel polymer particles without necessitating an intermediate step for removal of undried particles by disintegrating using a roll mill.

The absorbent resin thus obtained can be converted by the conventional method of surface treatment into an absorbent possessed of improved surface properties. A modifying method which comprises causing the absorbent resin to react with a cross-linking agent containing in the molecular unit thereof at least two functional groups capable of reacting with the functional group contained in the absorbent resin thereby heightening the density of cross-links in the surface region of the absorbent resin and a modifying method which comprises mixing the absorbent resin with a hydrophobic substance and, when necessary, causing them to react with each other and imparting hydrophobicity to the absorbent resin may be cited as concrete examples of the means to effect the conversion.

The absorbent resin obtained by the execution of the method of this invention or the absorbent resulting from the surface treatment described above may be subjected to the conventional method of agglomeration.

The absorbent resin or absorbent which is obtained by the method of this invention can be mixed with water-soluble polymeric substance, deodorant, perfume, medicine, plant growth promoter, fungicide, bactericide, pigment, dye, carbon black, activated carbon, and short fibers to acquire new functions.

Now, this invention will be described more specifically below with reference to working examples and controls. It should be noted, however, that the scope of this invention is not limited by these working examples.

The particle size distribution of hydrogel polymer particles as reduced to the dry basis, the particle size distribution of dried pulverized particles, the absorption ratio of dried pulverized particles used as an absorbent resin, the content of water-soluble substance, and the absorption rate which are mentioned in the following examples represent the numerical values determined by the following testing methods.

A. Particle size distribution of hydrogel polymer particles as reduced to the dry basis:

In 1,200 g of an aqueous 20 wt % sodium chloride solution, 25 g of sample hydrogel polymer particles (solids content $a$ wt %) were stirred for 60 minutes with a stirrer chip rotated at 300 rpm. After completion of the stirring, the resultant dispersion was transferred into superposed sieves (9.5 mm, 2.0 mm, 0.85 mm, 0.60 mm, 0.30 mm, and 0.075 mm in mesh size) and 6,000 g of an aqueous 20 wt % sodium chloride solution was slowly poured down into the superposed sieves to classify the hydrogel polymer particles. The classified fractions of hydrogel polymer particles on the sieves were thoroughly drained of water and weighed. The mesh size of a given sieve was converted to a mesh size, R (100), of the sieve corresponding to 100% by weight of solids of the hydrogel polymer particles stopped on the sieve in accordance with the following numerical formula 1. On a logarithmic probability chart, the particle sizes of the hydrogel polymer particles as reduced to the dry basis and corresponding to 100 wt % soids were plotted to obtain a particle size distribution.

$$R(100) \text{ (mm)} = \sqrt[3]{\frac{a}{100} \cdot \frac{25}{w}} \times \gamma \text{ (mm)} \qquad (1)$$

wherein R (100) is a mesh size (mm) of a sieve reduced to 100% by weight of hydrogel polymer particles, w is the total weight (g) of the classified and drained fraction of hydrogel polymer, and γ is the mesh size (mm) of the sieve used for separating the fraction of hydrogel polymer swelled in an aqueous 20% sodium chloride solution.

B. Particle size distribution of dried and pulverized polymer:

JIS standard sieves of 16 mesh, 30 mesh, 50 mesh, and 100 mesh were superposed on a receptacle plate. On the superposed sieves, 30 g of a dried and pulverized sample hydrogel polymer was placed and shaken thereon for 10 minutes with a sieve shaker. The fractions stopped on the sieves were weighed and their amounts were reported in % by weight.

C. Absorption ratio of dried and pulverized polymer:

About 0.2 g of dried and pulverized hydrogel polymer classified with JIS standard sieves of 16 to 100 mesh was accurately weighed out, placed uniformly in a teabag-like pouch of non-woven fabric (40 mm × 150 mm), and kept immersed in an aqueous 0.9% saline solution for 60 minutes. The wet sample was weighed. The absorption ratio was found in accordance with the following formula 2.

Absorption ratio (g/g) = [Weight after absorption (g) -Blank (g)]/[Weight of dried and pulverized polymer (g)]  (2)

D. Content of water-soluble substance in dried and pulverized polymer:

In 1,000 ml of deionized water, 0.5 g of dried and pulverized hydrogel polymer classified with JIS standard sieves of 16 to 100 mesh was dispersed and stirred for 16 hours, and passed through a filter paper (TOYO #6), to obtain about 100 g of a filtrate. Accurately 100 g of the filtrate was concentrated to about 2 to 3 ml with a rotary evaporator, diluted with deionized water, transferred into a petri dish (WO g), and evaporated to dryness ($W_1$ g) at 120° C. The content of water-soluble substance was found in accordance with the following formula 3.

Content of water-soluble substance (% by weight) = [($W_1$−$W_0$) × 1000](0.5 × 100) × 100  (3)

E. Absorption rate of dried and pulverized polymer:

In a 100-ml beaker, 50 ml (30° C.) of an aqueous 0.9% saline solution was stirred at 600 rpm with a stirrer chip. Into the beaker, 2.0 g of the dried and pulverized hydrogel polymer classified with JIS standard sieves of 16 to 100 mesh was instantaneously introduced. At this time, a stop watch was started. The stop watch was stopped at the point of time at which the stirrer chip exposed in the central part of the current of the saline solution were concealed by the swollen gel polymer. The time found by the clocking was reported as the absorption rate.

EXAMPLE 1

In a pressure kneader 7 made of stainless steel, having an inner volume of 75 liters, provided with twin arm Z vanes having an effective shear volume of 24.9 liters and a thermometer 15, and covered with a jacket 6 as illustrated in FIGS. 1 and 2, nitrogen was introduced at a rate of 50 liters/minute through a gas inlet 2 and the exhaust gas was discharged through a gas outlet 1' with a pressure lid 5 and a cover 4 kept in the state illustrated in FIG. 1 and a liquid inlet 1 and a nozzle 2' kept in a closed state. At this time, the cover 4 remained in close contact with the pressure kneader 7 through the medium of a seal member 9 by virtue of its own weight. In the meantime, nitrogen was introduced at a rate of 80 liters/minute through a gas inlet 3 and the exhaust gas was discharged through a gas outlet 3'. This operation was continued for 10 minutes to displace the interior of the system with nitrogen and then the gas outlet 3' was closed. In a separate vessel, an aqueous solution composed of 30 kg of an aqueous solution of a monomer component comprising 75 mol % of sodium acrylate and 25 mol % of acrylic acid (having a monomer component content of 37% by weight) and 18.6 g of trimethylol propane triacrylate as a cross-linking agent (0.05 mol % based on the monomer component) was blown with nitrogen to expel dissolved oxygen. The aqueous solution of monomer component consequently purged of dissolved oxygen was pressed with nitrogen and introduced via the liquid inlet 1. Then, the two vanes of the kneader were set rotating at 30 rpm and hot water at 35° C. was passed through the jacket 6 and a jacket 5' inside the pressure lid to heat the monomer component. Subsequently, an aqueous solution containing 15.0 g of sodium persulfate as a polymerization initiator and an aqueous solution containing 0.75 g of L-ascorbic acid were added via the liquid inlet 1. After the addition was completed, the liquid inlet 1 was closed. The monomer component began to polymerize four minutes after the addition of the polymerization initiator and, after the elapse of 13 minutes thence, reached the peak temperature 89° C. of polymerization. The stirring was continued further at 30 rpm. A particulate hydrogel polymer (A) was obtained 25 minutes after the start of polymerization. About 10% by weight of this hydrogel polymer (A) consisted of particles exceeding 10 mm in size. The amount of hydrogel polymer particles exceeding 10 mm in size was determined by taking a sample 500 g in size from the produced hydrogel polymer, separating particles exceeding 10 mm in size from the sample by visual observation, and calculating the proportion of the separated particles to the total weight, 500 g, of the sample. It was reported in terms of % by weight. The hydrogel polymer (A) was adjusted to about 65° C. by elevating the temperature of the hot water in the jacket to 70° C. and stirred by rotating the vanes at 30 rpm and the pressure lid 5 was lowered meanwhile to the position shown in FIG. 3 by driving a cylinder 8 with a hydraulic system. Specifically, the oil pressure of the cylinder 8 was adjusted so as to exert a mechanical pressure of 0.40 kg/cm² on the hydrogel polymer (A). Under an atmosphere of nitrogen, the hydrogel polymer (A) thus kept in a pressed state was subjected to shear force for 10 minutes, to impart a finely divided form to the hydrogel polymer. At this time, the pressure lid was 43 mm above the position of complete closure (gel agitation space 14/effective shear volume = 1). The ratio, gel agitation space 14/effective shear volume, was 1.33 and the ratio, gel agitation space 14/volume of gel, was 1.35. The produced hydrogel polymer (1) was taken out by driving the cylinder 8 with the hydraulic system thereby raising the pressure lid 5 and tilting the pressure kneader 7. Samples, 1 kg each, of the hydrogel polymer (A) and the hydrogel polymer (1) were severally placed in a metallic net tray 200 mm×280 mm×80 mm and dried in a hot air oven at 160° C. for 30 minutes. The sample of the hydrogel polymer (A) was dried ununiformly and contained an undried part and could not be pulverized. So, the hydrogel polymer (A) was given additional drying for 35 minutes. The dried hydrogel polymers were severally pulverized with a roll mill, to obtain a dry powder (A) and a dry powder (1) both of 16 mesh (1000 m$\mu$) pass. The hydrogel polymers thus produced were tested for particle size distribution and the dry powders were tested for particle size distribution, absorption ratio as an absorbent resin, a water soluble content, and absorption rate by the methods described above. The results of the test were are shown in Table 1 to 4.

Control 1

A hydrogel polymer (1a) for comparison was obtained by following the procedure of Example 1, except that the pressure lid 5 was not lowered to the position illustrated in FIG. 3 and the hydrogel polymer (A) not in a pressed state as shown in FIG. 1 was exposed to shear force under an atmosphere of nitrogen for 10 minutes. The hydrogel polymer (1a) for comparison thus obtained was dried in a hot air oven at 160° C. for 30 minutes similarly to the hydrogel polymer of Example 1. It was not uniformly dried and contained an undried portion and could not be pulverized. So, the hydrogel polymer (1a) for comparison was further dired for 30 minutes and then pulverized in the same manner as in Example 1, to produce a dry powder (1a) for comparison. The hydrogel polymer for comparison and the dry powder for comparison were tested in the same manner as in Example 1. The results of the test were as shown in Tables 1 to 4.

EXAMPLE 2

A hydrogel polymer (2) was obtained by following the procedure of Example 1 , excepting the pressure lid 5 was lowered to the position of FIG. 3 by driving the cylinder 8 with the hydraulic system after the monomer component reached the peak temperature 89° C. of polymerization. A dry powder (2) was obtained by drying the produced hydrogel polymer (2) in a hot air oven and then pulverizing the dried hydrogel polymer in the same manner as in Example 1. The hydrogel polymer and the dry powder were tested in the same manner as in Example 1. The results of the test were as shown in Tables 1 to 4.

EXAMPLE 3

The procedure of Example 1 was repeated, except that the pressure lid 5 was lowered to a position 20 mm above the position of complete closure immediately after start of the polymerization and kept at this position thereafter. The monomer component began to polymerize 3 minutes after the addition of the polymerization initiator and, after the elapse of 12 minutes thence, reached the peak temperature 86° C. of polymerization. The stirring was continued further at 30 rpm. After the elapse of 40 minutes following the start of polymerization, a particulate hydrogel polymer (3) was obtained at 60° C. When the ratio of polymerization empirically estimated by the generation of heat of polymerization reached about 60%, pressure began to apply on the hydrogel polymer. The mechanical pressure thereon was adjusted to 0.12 kg/cm$^2$. Eventually, the pressure lid 5 settled at a position 73 mm above the position of complete closure, at which point the ratio, gel agitation space/effective shear volume, was 1.57 and the ratio, gel agitation space 14/volume of gel, was 1.59. The hydrogel polymer (3) consequently obtained was dried in a hot air oven and pulverized in the same manner as in Example 1, to obtain a dry powder (3). The hydrogel polymer and the dry powder obtained as described above were tested in the same manner as in Example 1. The results of the test were as shown in Tables 1 to 4.

EXAMPLE 4

The procedure of Example 1 was repeated, except that the amount of the aqueous solution of the monomer component was changed to 36 kg (monomer component content 37% by weight), the amount of the trimethylol propane triacrylate as a cross-linking agent was changed to 22.3 g (0.05 mol % based on the monomer component), and the pressure lid 5 was lowered to a position 35 mm above the position of complete closure immediately after start of the polymerization. The monomer component began to polymerize three minutes after the addition of the polymerization initiator and, after the elapse of 12 minutes thence, reached the peak temperature 94° C. of polymerization. The stirring was continued further at 30 rpm. After 25 minutes following the start of polymerization, a particulate hydrogel polymer (4) of a temperature of 70° C. was obtained. When the ratio of polymerization empirically estimated by the generation of heat of polymerization reached about 60%, pressure began to apply to the hydrogel polymer. The mechanical pressure thereon was adjusted to 0.40 kg/cm$^2$. Eventually, the pressure lid 5 settled at a position 63 mm above the position of complete closure, at which point the ratio, gel agitation space 14/effective shear volume, was 1.49 and the ratio, gel agitation space 14/volume of gel was 1.25. The hydrogel polymer (4) consequently obtained was dried in a hot air oven and pulverized in the same manner as in Example 1, to obtain a dry powder (4). The hydrogel polymer and the dry powder obtained as described above were tested in the same manner as in Example 1. The results of the test were as shown in Tables 1 to 4.

EXAMPLE 5

A hydrogel polymer (A) similar to what was obtained in Example 1 was produced by carrying out polymerization in the same manner as in Example 1. This hydrogel polymer (A) was adjusted to about 50° C. and the vanes were kept rotating at 20 rpm and the pressure lid 5 was lowered meantile by the hydraulic system. The oil pressure of the cylinder 8 was adjusted so as to adjust the mechanical pressure applied to the hydrogel polymer (A) to 0.12 kg/cm$^2$. The hydrogel polymer (A) thus kept in a pressed state was exposed to shear force under an atmosphere of nitrogen for 15 minutes. Consequently, a finely divided hydrogel polymer (5) was obtained. At this time, the pressure lid 5 was at a position 73 mm above the position of complete closure. The ratio, gel agitation space 14/effective shear volume, was 1.57 and the ratio, gel agitation space 14/volume of gel, was 1.59. The hydrogel polymer (5) thus obltained was dried in a hot air oven and pulverized in the same manner as in Example 1, to obtain a dry powder (5). The hydrogel polymer and the dry powder obtained as described above were tested in the same manner as in Example 1. The results of the test were as shown in Tables 1 to 4.

EXAMPLE 6

A hydrogel polymer (6) was obtained by following the procedure of Example 5, excepting the temperature of the hydrogel polymer (A) was changed to 70° C., the number of rotation of the vanes to 10 rpm, and the mechanical pressure applied to the hydrogel polymer (A) to 1.0 kg/cm$^2$. At this time, the pressure lid 5 was at a position 15 mm above the position of complete closure. The ratio, gel agitation space 14/effective shear volume, was 1.12 and the ratio, gel agitation space 14/volume of gel, was 1.13. The hydrogel polymer (6) thus obtained was dried in a hot air oven and pulverized in the same manner as in Example 5, to obtain a dry powder (6). The hydrogel polymer and the dry powder obtained as described above were tested in the same manner as in Example 5. The results of the test were as shown in Tables 1 to 4.

Control 2

A hydrogel polymer (A) similar to what was obtained in Example 1 was produced by carrying out polymerization in the same manner as in Example 1. This hydrogel polymer (A) was adjusted to 37° C. and then subjected to the same procedure as in Example 1. The hydrogel polymer (A) assumed a kneaded state and failed to form a particulate hydrogel polymer.

Control 3

The procedure of Example 1 was repeated, except that the interior of the system was adjusted so as to apply a mechanical pressure of 1.52 kg/cm$^2$ to the hydrogel polymer (A). The scale reading of an ammeter of the drive motor for the vanes far exceeded the set limit and the kneader became inoperable.

Control 4

The procedure of Example 1 was repeated, except that the pressure lid 5 was lowered to a position 115 mm above the position of complete closure immediately after start of the polymerization. The monomer component began to polymerize three minutes after the addition of the polymerization initiator and, after the elapse of 12 minutes thence, reached the peak temperature 88° C. of polymerization. The stirring was further continued at 30 rpm. After the elapse of 25 minutes following the start of polymerization, a hydrogel polymer (4a) for comparison was obtained at 62° C. The motion of the pressure lid 5 and the scale reading of the ammeter of the drive motor for the vanes indicated that virtually no pressure was applied to the hydrogel polymer, although the pressure lid 5 contacts with the hydrogel. At this time, the ratio, gel agitation space 14/effective shear volume, was 1.89 and the ratio, gel agitation space 14/volume of gel, was 1.91. The hydrogel polymer (4a) for comparison was dried in a hot air oven at 160° C. for 30 minutes in the same manner as in Example 1. It was dried ununiformly and contained an undried part and could not be pulverized. So, the hydrogel polymer (4a) was further dried for 30 minutes and the dry powder consequently obtained was pulverized in the same manner as in Example 1, to produce a dry powder (4a) for comparison. The hydrogel polymer and the dry powder thus obtained for comparison were tested in the same manner as in Example 1. The results of the test were as shown in Tables 1 to 4.

EXAMPLE 7

A kneader of stainless steel having an overall inner volume of 10 liters, provided with twin arm type sigma vanes having an effective shear volume of 5.5 liters and a thermometer, and covered with a jacket was charged with 6.6 kg of an aqueous solution of a monomer component comprising 75 mol % of sodium acrylate and 25 mol % of 2-acrylamide-2-methyl propane sulfonic acid (monomer component content 35% by weight) and 2.3 g of N,N'-methylenebisacrylamide as a cross-linking agent (0.08 mol % based on the monomer component) and blown with nitrogen gas to displace the interior of the reaction system with nitrogen gas. Then, the two kneader vanes were set rotating at 45 rpm, the jacket was heated by passage therethrough of hot water at 35° C., and 2.3 g of sodium persulfate as a polymerization initiator and 0.1 g of L-ascorbic acid were added to the reaction system. The monomer component began to polymerize two minutes after the addition of the polymerization initiator and, after the elapse of 10 minutes thence, reached the peak temperature 89° C. of polymerization. The stirring was continued further at 45 rpm. A particulate hydrogel polymer (B) was obtained 25 minutes after the start of polymerization. At this time, about 15% by weight of the gel polymer (B) consisted of particles exceeding 10 mm in size. The hydrogel polymer (B) was adjusted to about 70° C. by elevating the temperature of the hot water in the jacket to 75° C., the vanes were kept rotating at 45 rpm, and the pressure lid was lowered. The interior of the kneader was adjusted so as to apply a mechanical pressure of about 0.06 kg/cm$^2$ to the hydrogel polymer (B) and the hydrogel polymer (B) thus kept in a pressed state was exposed to shear force under an atmosphere of nitrogen for 15 minutes. Consequently, a finely divided hydrogel polymer (7) was obtained. At this time, the pressure lid was at a position 25 mm above the position of complete closure (namely, the ratio, gel agitation space/effective shear volume=1). The ratio, gel agitation space/effective shear volume, was 1.25 and the ratio, gel agitation space/volume of gel, was 1.25. The hydrogel polymer (7) thus obtained was dried in a hot air oven and pulverized in the same manner as in Example 1, to obtain a dry powder (7). The hydrogel polymer and the dry powder obtained as described above were tested in the same manner as in Example 1. The results of the test were as shown in Tables 1 to 4.

EXAMPLE 8

A kneader identical to the kneader of Example 7, except that the pressure lid was provided with a reticular bottom and adapted to vacuumize the interior of the reaction system, was charged with the aqueous solution of the same monomer component as used in Example 7 and blown with nitrogen gas to displace the interior of the reaction system with nitrogen gas. Then, the two kneader vanes were kept rotating at 45 rpm, the jacket was heated by passage therethrough of hot water at 35° C., and 2.3 g of sodium persulfate as a polymerization initiator and 0.1 g of L-ascorbic acid were added to the reaction system. The pressure lid was lowered to a position 10 mm above the position of complete closure immediately after start of the polymerization. At this time, the gaseous pressure inside the reaction system was lowered to 100 mmHg. The monomer component began to polymerize two minutes after the addition of the polymerization initiator and, after the elapse of 10 minutes thence, reached the peak temperature 70° C. of polymerization. Then, the temperature of hot water in the jacket was elevated to 75° C. so as to keep the temperture of the hydrogel polymer at about 70° C. and the stirring was continued under a vacuum. At this time, the pressure lid was at a position 25 mm above the position of complete closure. The ratio, gel agitation space/effective shear volume, was 1.25 and the ratio, gel agitation space/volume of gel, was 1.25. After the elapse of 20 minutes following the start of polymerization, the interior of the reaction system was returned to the normal pressure (760 mmHg) and the stirring was continued further at 20 rpm. A finely divided hydrogel polymer (8) was produced 50 minutes after the start of polymerization. The hydrogel polymer (8) thus obtained was dried in a hot oven air and pulverized in the same manner as in Example 7, to produce a dry powder (8). The hydrogel polymer and the dry powder obtained as described above were tested in the same manner as in Example 7. The results of the test were as shown in Tables 1 to 4.

Control 5

A hydrogel polymer (5a) for comparison was obtained by repeating the procedure of Example 7, except that the pressure lid was not lowered and the hydrogel polymer (B) not in a pressed state was exposed to shear force under an atmosphere of nitrogen for 15 minutes. The hydrogel polymer (5a) for comparison thus obtained was dried in a hot air oven at 160° C. for 30 minutes in the same manner as in Example 7. It was dried ununiformly and contained an undried part and could not be pulverized. So, the hydrogel polymer (5a) was dried further for 30 minutes. A dry powder consequently obtained was pulverized in the same manner as in Example 7 to obtain a dry powder (5a) for comparison. The hydrogel polymer for comparison and the dry powder for comparison were tested in the same manner as in Example 7. The results of the test were as shown in Tables 1 to 4.

EXAMPLE 9

Figure 6:
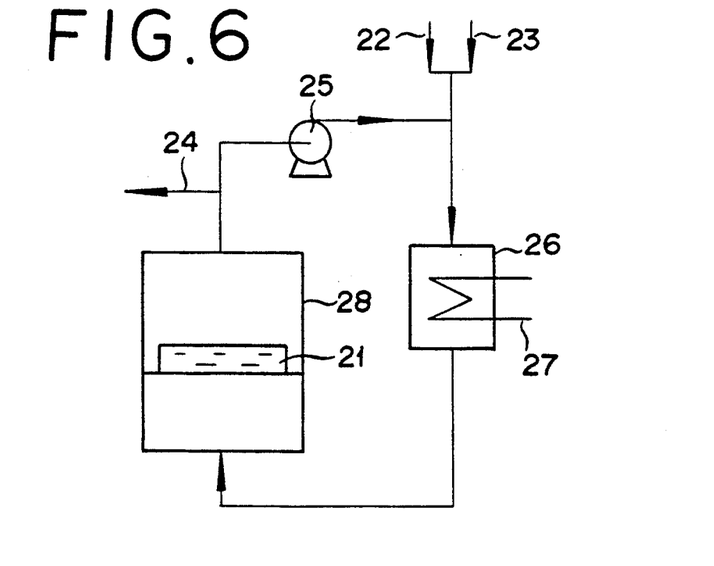
FIG. 6 is a schematic diagram of a device to be used for drying hydrogel polymer particles obtained by this invention.

A hydrogel polymer (9) was obtained by following the procedure of Example 1, except that 37.5 g of sodium persulfate was used as a polymerization initiator. In a hot air drier (draft type drier as illustrated in FIG. 6), the hydrogel polymer (9) was spread in a thickness of 35 mm. Then, a hot steam-air mixed gas having a temperature of 105° C. and a dew point of 85° C. and produced by introducing gases from a fresh air inlet pipe 22 and a steam inlet pipe 23 into a heat exchanger 26 and heating the resultant gas mixture with the heat transfer medium introduced through a heat medium inlet pipe 27 was blown against the bed of the hydrogel polymer at a rate of 0.8 m/sec. By this treatment continued for 50 minutes, the hydrogel polymer was converted into a bulk dried to a water content of about 8%. Part of the mixed gas was released via a discharge pipe 24 and circulated by a blower 25 to the heat exchanger 26. The dry bulk consequently obtained was pulverized in the same manner as in Example 1, to form a dry powder (9). The hydrogel polymer and the dry powder obtained as described above was tested in the same manner as in Example 1. The results of the test were as shown in Tables 1 to 4. By the method described below, the residual monomer content of the dry powder was found to be 20 ppm.

In 1,000 ml of deionized water, 0.50 g of the dry powder was disperded and stirred for two hours. Then, the resultant solution was passed through a Wattman filter paper, GF/F (particle retaining ability 0.7 microns) and the filtrate consequently obtained was analyzed by liquid chromatography.

Control 6

A hydrogel polymer (6a) for comparison was obtained by repeating the procedure of Control 1, except that 37.5 g of sodium persulfate was used as a polymerization initiator. The hydrogel polymer (6a) thus obtained was dried in the same manner as in Example 9. It was dried ununiformly and contained an undried part and could not be pulverized. So, the hydrogel polymer (6a) for comparison was dried further for 70 minutes. The resultant dried bulk was pulverized in the same manner as in Example 9, to produce a dry powder (6a) for comparison. The hydrogel polymer for comparison and the dry powder for comparison obtained as described above were tested in the same manner as in Example 9. The results of the test were as shown in Tables 1 to 4. The residual monomer content of the dry powder determined by the same method as used in Example 9 was 20 ppm.

EXAMPLE 10

One hundred (100) parts by weight of the dry powder (1) obtained in Example 1 was mixed with an aqueous mixture comprising 1 part by weight of glycerol, 2 parts by weight of water, and 8 parts by weight of isopropanol. The resultant mixture was placed in a bowl immersed in an oil bath (195° C.) and heat-treated in a stirred state for 45 minutes to form an absorbent (10). The absorbent was tested in the same manner as in Example 1. The results of the test were as shown in Tables 1 to 4. It was further tested for absorption performance under pressure by the following method. The absorption ratio under pressure for the periods of 5 minutes and 30 minutes were respectively 17 ml/g and 26 ml/g.

Method for Testing Absorption Performance Under Pressure

Figure 7:
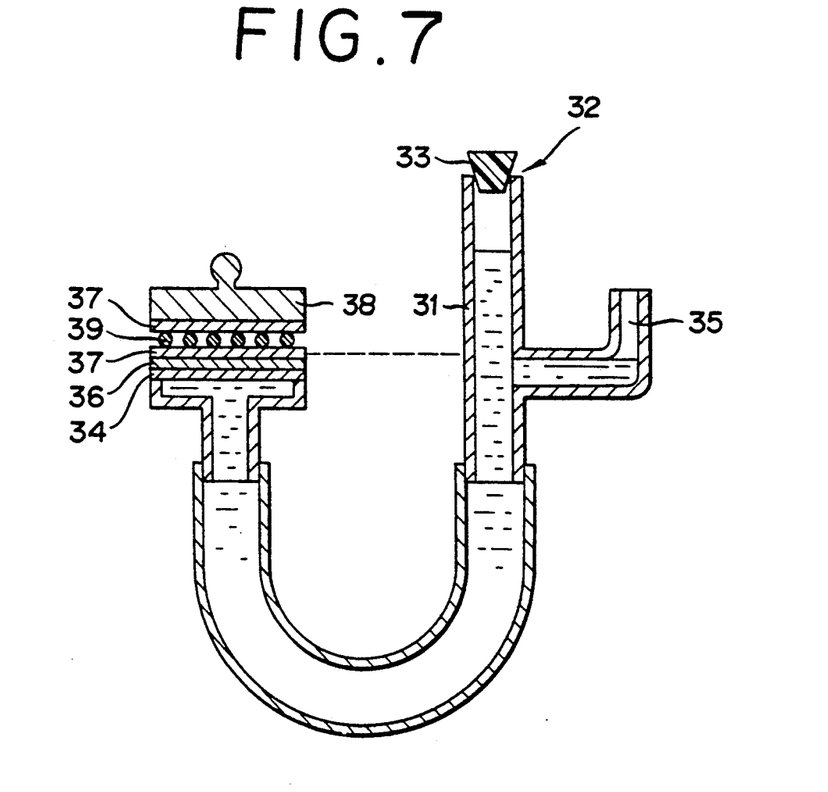
FIG. 7 is a schematic diagram of a device to be used for determining the amount of water absorbed under application of pressure by absorbent resin obtained by this invention.

By the use of an apparatus illustrated in FIG. 7, the amounts of water absorbed by a given sample under pressure for the periods of 5 minutes and 30 minutes were measured to determine absorption rate under pressure and absorption ratio under pressure. An upper mouth 32 of a buret 31 was stoppered with a plug 33 and a measuring base 34 and an air inlet 35 were set flush with each other. On a glass filter 36 of a diameter of 70 mm set in the measuring base 34, a filter paper 37, 0.2 g of the absorbent 39, and a filter paper 37 were mounted and a weight 38 of 20 g/cm$^2$ was further superposed thereon and these items were left absorbing artificial urine (containing 1.9% of urea, 0.8% of NaCl, 0.1% of CaCl.2, and 0.1% of MgSO.4). The amount of the artificial urine absorbed was reported as the absorption ratio (ml/g) under pressure.

Control 7

An absorbent (7a) for comparison was obtained by repeating the procedure of Example 10, except that the dry powder (1a) for comparison obtained in Control 1 was used in the place of the dry powder (1). The absorbent thus obtained was tested by the same method as used in Example 1. The results of the test were as shown in Tables 1 to 4. When this absorbent was tested for absorption ratio under pressure by the same method as used in Example 10, the absorption ratios under pressure for the periods of 5 minutes and 30 minutes were respectively 11 ml/g and 25 ml/g.

TABLE 1

|  | Example 1 | Control 1 | Example 2 | Example 3 |
|---|---|---|---|---|
| Mechanical pressure (kg/cm²) | 0.40 | Nothing | 0.40 | 0.12 |
| Gel temperature (°C.) | 65 |  | 89 | 60–86 |
| Hydrogel polymer | (1) | (A) | (1a) | (2) | (3) |
| Coarse gel* (%) | 0 | 10 | 8 | 0 | 0 |
| Particle size distribution on dry basis (%) |  |  |  |  |  |
| 850 μm on | 9 | 50 | 46 | 7 | 5 |
| 150 μm thru | 16 | 13 | 14 | 18 | 18 |
| Dry powder | (1) | (A) | (1a) | (2) | (3) |
| Particle size distribution (%) |  |  |  |  |  |
| 16 mesh on | 0 | 3 | 2 | 1 | 0 |
| 16–30 mesh | 20 | 19 | 19 | 19 | 18 |
| 30–50 mesh | 51 | 43 | 44 | 49 | 51 |
| 50–100 mesh | 22 | 21 | 21 | 24 | 25 |
| 100 mesh thru | 7 | 14 | 14 | 7 | 6 |
| Absorption ratio (g/g) | 51 | 46 | 46 | 51 | 52 |
| Water soluble content (%) | 10 | 10 | 11 | 10 | 9 |
| Absorption rate (sec) | 59 | 88 | 86 | 57 | 55 |

*Particle size exceeding 10 mm in size

TABLE 2

|  | Example 4 | Example 5 | Example 6 | Control 2 | Control 3 |
|---|---|---|---|---|---|
| Mechanical pressure (kg/cm²) | 0.40 | 0.12 | 1.0 | 0.40 | 1.52 |
| Gel temperature (°C.) | 70–94 | 50 | 70 | 37 | 65 |
| Hydrogel polymer | (4) | (5) | (6) |  |  |
| Coarse gel* (%) | 0 | 0 | 0 | kneading state | operation impossible |
| Particle size distribution on dry basis (%) |  |  |  |  |  |
| 850 μm on | 10 | 5 | 4 |  |  |
| 150 μm thru | 16 | 20 | 19 |  |  |
| Dry powder | (4) | (5) | (6) |  |  |
| Particle size distribution (%) |  |  |  |  |  |
| 16 mesh on | 0 | 0 | 0 |  |  |
| 16–30 mesh | 21 | 15 | 12 |  |  |
| 30–50 mesh | 51 | 49 | 51 |  |  |
| 50–100 mesh | 22 | 27 | 28 |  |  |
| 100 mesh thru | 6 | 9 | 9 |  |  |
| Absorption ratio (g/g) | 52 | 51 | 51 |  |  |
| Water soluble content (%) | 10 | 11 | 10 |  |  |
| Absorption rate (sec) | 58 | 60 | 53 |  |  |

*Particle size exceeding 10 mm in size

TABLE 3

|  | Control 4 | Example 7 | Example 8 | Control 5 |
|---|---|---|---|---|
| Mechanical pressure (kg/cm²) | ~0 | 0.06 | 0.06 | Nothing |
| Gel temperature (°C.) |  | 70 | ~70 |  |
| Hydrogel polymer | (4a) | (7) | (8) | (5a) |
| Coarse gel* (%) | 8 | 0 | 0 | 13 |
| Particle size distribution on dry basis (%) |  |  |  |  |
| 850 μm on | 45 | 14 | 13 | 52 |
| 150 μm thru | 15 | 13 | 13 | 10 |
| Dry powder | (4a) | (7) | (8) | (5a) |
| Particle size distribution (%) |  |  |  |  |
| 16 mesh on | 2 | 0 | 0 | 3 |
| 16–30 mesh | 19 | 18 | 19 | 22 |
| 30–50 mesh | 45 | 53 | 55 | 41 |
| 50–100 mesh | 20 | 23 | 20 | 19 |
| 100 mesh thru | 14 | 6 | 6 | 15 |
| Absorption ratio (g/g) | 46 | 48 | 48 | 43 |
| Water soluble content (%) | 10 | 7 | 6 | 7 |
| Absorption rate (sec) | 84 | 52 | 50 | 82 |

*Particle size exceeding 10 mm in size

TABLE 4

|  | Example 9 | Control 6 | Example 10 | Control 7 |
|---|---|---|---|---|
| Mechanical pressure (kg/cm²) | 0.40 | Nothing |  |  |
| Gel temperature (°C.) | 65 |  |  |  |
| Hydrogel polymer | (9) | (6a) |  |  |
| Coarse gel* (%) | 0 | 9 |  |  |
| Particle size distribution on dry basis (%) |  |  |  |  |
| 850 μm on | 8 | 48 |  |  |
| 150 μm thru | 17 | 13 |  |  |
| Dry powder | (9) | (6a) | (Absorbent) (10) | (Absorbent) (7a) |
| Particle size distribution (%) |  |  |  |  |
| 16 mesh on | 0 | 2 | 0 | 3 |
| 16–30 mesh | 20 | 20 | 23 | 21 |
| 30–50 mesh | 50 | 42 | 54 | 47 |
| 50–100 mesh | 23 | 21 | 19 | 19 |
| 100 mesh thru | 7 | 15 | 4 | 10 |
| Absorption ratio (g/g) | 49 | 44 | 48 | 43 |
| Water soluble content (%) | 10 | 11 | 9 | 10 |
| Absorption rate (sec) | 58 | 86 | 54 | 80 |

*Particle size exceeding 10 mm in size

What is claimed is:

1. A method for the production of a particulate hydrogel polymer by the exposure of a hydrogel polymer possessing a cross-linked structure to shear force in a vessel thereby finely dividing said hydrogel polymer, which method comprises exerting shear force repeatedly on said hydrogel polymer while keeping said hydrogel polymer at a temperature in the range of from 40° to 110° C. and applying a load on said hydrogel polymer in the range of from 0.01 to 1.5 kg/cm², wherein said vessel has an inner volume 1.1 to 1.8 times the volume of said hydrogel polymer.

2. A method according to claim 1, wherein said vessel is a kneader provided with a plurality of rotary stirring shafts.

3. A method according to claim 1, wherein said vessel has an inner volume 1.0 to 2.0 times the volume of space (effective shear volume) $V_1$ which remains after the deduction of the total volume of the rotary stirring shafts and rotary arms from the volume of space formed by the rotation of the rotary arms of said rotary stirring shafts.

4. A method according to claim 1, wherein said hydrogel polymer is a hydrogel polymer formed by effecting polymerization of a monomer component capable of forming a hydrogel in consequence of polymerization comprising an ethylenically unsaturated monomer and a cross-linking agent.

5. A method according to claim 4, wherein said hydrogel polymer is a hydrogel polymer having a degree of polymerization of said monomer component in the range of from 10 to 100%.

6. A method according to claim 4, wherein said polymerization of said monomer component is performed under a vacuum.

7. A method according to claim 6, wherein the degree of vacuum is in the range of from 1 to 500 mmHg.

8. A method according to claim 4, wherein said ethylenically unsaturated monomer is at least one member selected from the group consisting of (meth)acrylic acid (and salts thereof), 2-(meth)acryloyl ethanesulfonic acid (and salts thereof), 2-(meth)acrylamide-2-methyl propanesulfonic acid (and salts thereof), (meth)acrylamide, methoxypolyethylene glycol (meth)acrylate, N,N-dimethylaminoethyl (meth)acrylate, and quaternization products thereof.

9. A method according to claim 4, wherein said ethylenically unsaturated monomer is a (meth)acrylic acid and salts thereof.

10. A method according to claim 9, wherein said (meth)acrylic acid has 30 to 90 mol % thereof neutralized with a basic substance.

11. A method according to claim 4, wherein said hydrogel polymer is a hydrogel polymer having a degree of polymerization of said monomer component in the range of from 20 to 100%.

12. A method according to claim 1, wherein said hydrogel polymer has a water content in the range of from 40 to 90% by weight.

13. A method for the production of an absorbent resin which comprises exerting shear force repeatedly on a hydrogel polymer possessing a cross-linked structure while keeping said hydrogel polymer at a temperature in the range of from 40° to 110° C. under mechanical pressure in the range of from 0.01 to 1.5 kg/cm$^2$ thereby finely dividing said hydrogel polymer into a particulate hydrogel polymer, and drying the resultant particulate hydrogel polymer.

14. A method according to claim 13, which further comprises pulverizing and/or disintegrating the dried particulate hydrogel polymer.

15. A method according to claim 13 or claim 14, wherein said drying is effected by exposing said hydrogel polymer at a temperature in the range of from 80° to 250° C. to a gas containing at least steam and possessing a dew point in the range of from 50° to 100° C.

16. A method according to claim 14, wherein said pulverization and/or disintegration is performed with a roll mill (roll-rotating pulverizing device).

17. A method for the production of an absorbent resin, which comprises mixing the absorbent resin set forth in claim 13 or claim 14 with a cross-linking agent possessing at least two functional groups capable of reacting with the functional group possessed by said absorbent resin and allowing them to react with each other thereby heightening a cross-link density in the surface region of said absorbent resin.

* * * * *